Dec. 20, 1966   G. M. ROSENBERRY, JR   3,293,517
CONTROL SYSTEM FOR SYNCHRONOUS MACHINES
Filed Jan. 2, 1964   2 Sheets-Sheet 1

*INVENTOR.*
GEORGE M. ROSENBERRY, JR.
BY
HIS ATTORNEY

Dec. 20, 1966   G. M. ROSENBERRY, JR   3,293,517
CONTROL SYSTEM FOR SYNCHRONOUS MACHINES
Filed Jan. 2, 1964                                    2 Sheets-Sheet 2

1 VOLT / DIV.
1 MILLI SEC/ DIV

1 VOLT / DIV.
1 MILLI SEC/DIV

INVENTOR.
GEORGE M. ROSENBERRY, JR.
BY
HIS ATTORNEY

United States Patent Office 3,293,517
Patented Dec. 20, 1966

3,293,517
CONTROL SYSTEM FOR SYNCHRONOUS MACHINES
George M. Rosenberry, Jr., Schenectady, N.Y., assignor to General Electric Company, a corporation of New York
Filed Jan. 2, 1964, Ser. No. 335,113
7 Claims. (Cl. 318—167)

The invention described herein relates to a control system for synchronous machines and more particularly to a circuit for limiting the induced voltages in a motor or generator field winding to safe values.

My prior Patent 3,098,959 entitled Starting System for a Synchronous Motor and assigned to the same assignee as the present invention, describes the problems associated with protecting exciter rectifiers and a field winding of a brushless synchronous motor during the accelerating period. To overcome the problems discussed in the patent, a pair of series connected silicon controlled rectifiers are placed in parallel with the motor field winding and with the exciter rectifiers. A common connection extends from the controlled rectifiers to one of the exciter rectifiers and the exciter armature winding.

When the induced voltage in the motor field winding reaches a predetermined magnitude, the zener diodes convert the controlled rectifiers to a conducting state and thus short circuit the field winding, thereby protecting both the exciter rectifiers and field winding against overvoltage conditions. Since the controlled rectifiers common connection with the exciter rectifiers permits the current to go to zero during each cycle, the controlled rectifiers are assured of being made non-conductive when the induced field voltage falls to safe levels. The controlled rectifiers therefore cannot be kept in a conducting state by the exciter current when the motor is held in synchronism by its reluctance torque.

Although the control system described above is both efficient and successful in operation, further developmental efforts showed that certain improvements could be made to reduce the circuit costs and improve the over-all reliability. The zener diodes used in the old circuit must be matched closely to prevent damage to the gate of their respective silicon controlled rectifiers. The maximum permissible voltage to be applied to the controlled rectifier gates cannot exceed a predetermined value and if the zener diodes are not accurately matched, the voltage on either one, depending on the state of circuit operation, may be greater than the permissible voltage, and therefore cause failure of the controlled rectifiers. Although the zener diodes usually contain sufficient resistance because of their volt-ampere characteristics, the possibility of controlled rectifier damage is minimized but zener diode mismatching may constitute a source of trouble in the circuit.

The costs for the silicon controlled rectifiers and the zener diodes are doubled because two of each are required in the circuit. The two zener diodes do not contribute to the rating of the rotating equipment and contribute only to the method of controlling the conduction of the two controlled rectifiers. Moreover, if either of the controlled rectifiers fails in a manner so that it cannot be made conducting, the other one also will fail because the gate circuit or voltage applied to it will be too great for the rating.

Still another disadvantage arises when the patented control circuit is used in protecting the rectifiers of a single phase exciter. Under single phase conditions, the current goes to zero twice per cycle and the exciter therefore cannot supply as much power to the field winding as a three-phase rectifying system.

The object of my invention therefore is to eliminate the disadvantages inherent in the patented system described above and additionally provide a circuit of lower cost and greater reliability.

In carrying out my invention, I provide a control system for shortcircuiting a synchronous machine field winding by employing a single silicon controlled rectifier under the control of a single zener diode which causes the controlled rectifier to conduct induced field current during one half of an induced voltage cycle, while the current during the other half cycle is carried by the exciter rectifiers. When the condition causing the high induced voltage dissipates itself to the point where the exciter voltage exceeds the induced voltage, the controlled rectifier is made non-conducting when the voltage of one phase of the exciter goes negative. To assure conversion of the controlled rectifier to a non-conducting state, one terminal of at least one of the exciter rectifiers is not connected to a phase of the exciter winding and the current is therefore required to go to zero, thus eliminating the possibility of the controlled rectifier being kept conducting by the output of the exciter when the motor runs in synchronism due to reluctance torque of the motor. It will be apparent to those skilled in the art that many different connections of the exciter rectifiers may be made to require the voltage to decrease to zero during any one cycle for turning off the controlled rectifier when the induced voltage is exceeded by the exciter voltage.

While the specification concludes with claims particularly pointing out and distinctly claiming the subject matter which I regard as my invention, it is believed the invention will be better understood from the following description taken in connection with the accompanying drawings in which:

FIGURE 1 schematically illustrates a field shorting circuit for a rotor of a synchronous machine including the disposition of a controlled rectifier relative to the full wave rectifier bridge connected to an exciter;

Figure 1:
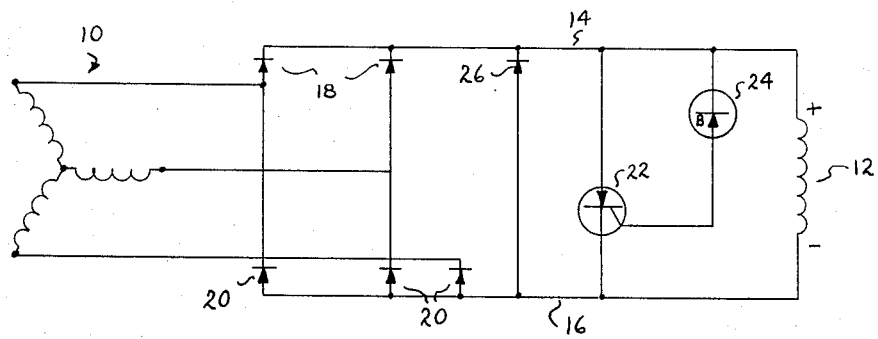
FIGURE 1A illustrates curves showing that when a controlled rectifier shorts the output of the exciter, the voltage on the controlled rectifier reverses once per cycle.

Referring now to the drawing wherein like reference characters designate like or corresponding parts throughout the several views there is shown in FIGURE 1, a schematic diagram of a rotor for a brushless synchronous motor or generator used for illustrating the invention. As in conventional designs, the exciter output winding 10 and the field winding 12 for the motor are mounted on the same shaft (not shown) and interconnected by conductors 14 and 16 for permitting the application of exciter power to the field winding during operation. The exciter output is changed to unidirectional current by rectifiers 18 and 20 of a full wave rectifier bridge and the rectifiers preferably are mounted on a heat sink, usually the fan blades for the rotor. A silicon controlled rectifier 22 is connected across the exciter rectifiers and the motor field winding 12 and is converted to a conducting state by a zener diode 24 or any other type of voltage sensitive device, or combination of devices having their output connected to a gate of the controlled rectifier.

During synchronous speed operation, the three phase exciter winding 10 provides an A.C. voltage which is rectified and supplied to the field winding 12. As the synchronous machine accelerates and induced voltages are generated in the winding 12, the lower terminal of the winding as viewed in FIGURE 1, becomes positive and the current flows through rectifier 26 in a closed circuit with the field winding. When the voltage reverses and the upper terminal becomes positive as shown in FIGURE 1, the zener diode 24, which is chosen to conduct when the induced voltages reach a predetermined value, supplies a current to the gate of the controlled rectifier 22 thereby converting it to a conducting state. During this half of the cycle, the currents are conducted in a closed path through the controlled rectifier and the motor field winding. This arrangement therefore protects both the exciter rectifiers and the field winding during each cycle of induced voltage.

To provide such protection to the rectifiers 18 and 20, the level at which the zener diode 24 is chosen to conduct is less than that value of reverse voltage which would cause damage to the rectifiers 18 and 20. As the motor accelerates, the induced voltages decrease in magnitude and as it approaches synchronism, they practically disappear. When the induced field voltage becomes less than the zener 24 voltage, the controlled rectifier 22 no longer conducts and the exciter starts to supply excitation power to the field winding 12 and continues to do so until synchronism is reached, at which time the induced voltages are practically zero.

Since the controlled rectifier 22 could be kept in a conducting condition by the exciter voltage, when the reluctance torque of the motor is sufficient to maintain synchronism, the circuit is designed to convert the controlled rectifier to a non-conducting state when conditions of this kind appear in the circuit. This is accomplished by connecting one rectifier 26 of the six in the full wave bridge directly across the motor field winding 12. Its cathode is not connected to one phase of the exciter as in conventional designs. This circuit arrangement unbalances the D.C. output of the exciter so that the output voltage and current goes to zero once per cycle. The current flowing through the controlled rectifier 22 will therefore decrease to zero and since the controlled rectifier characteristics maintain it in a non-conducting state after the current goes to zero, full excitation power then may be supplied to the field winding. It cannot be turned on until the zener diode 24 supplies the necessary gate current to the controlled rectifier to again convert it to a conducting state.

Figure 3:
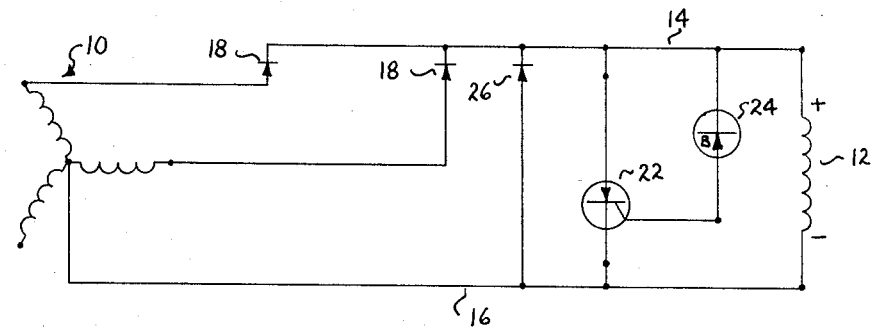
FIGURE 3 illustrates the use of a half wave rectifying bridge for providing exciter power to a motor field winding.
Figure 1A:
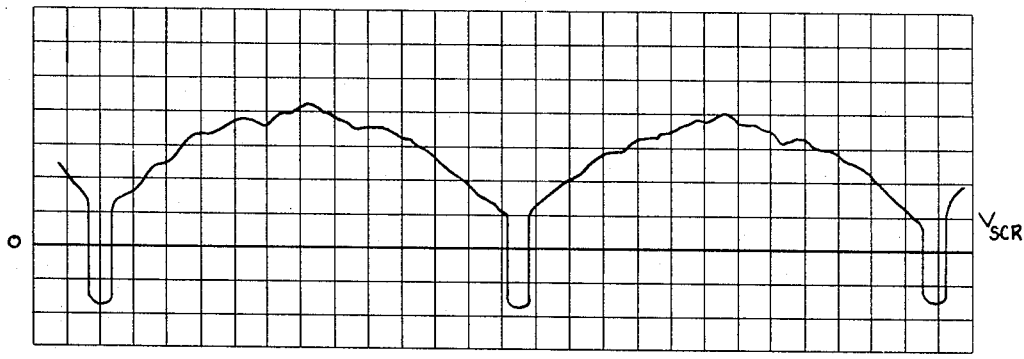

Although synchronous machines incorporating the circuits of FIGURES 1 and 3 are operating successfully, to determine initially whether the rectified voltage supplied to the field winding from the phase connected to rectifier 26 decreased to zero once per cycle, for simplicity, a rectifier was substituted for the controlled rectifier in the circuit to short the D.C. output of the exciter. When the exciter commenced supplying power to the field winding, oscillograms were taken and as shown in FIGURE 1A, the curves show that the voltage does reverse during each cycle. The exciter used for carrying out this test had a rating of 2 kw., 1800 r.p.m., 6 pole and a 6 ohm field. Exciter field current for the test was 2.8 amperes. The exciter field current was set for a value which gave about 30 amperes output when delivering power to the field winding 12. The curves made are imposed on a chart having 2 milliseconds and one volt per division. The voltage is indicated as $V_{SCR}$.

The curve shows the rectifier voltage ($V_{SCR}$) was negative for about 600 microseconds and at that time the current was zero. Note that the negative voltage approaches one volt after it passes through zero. The length of time negative voltage was applied to the controlled rectifier is more than adequate to convert the controlled rectifier to a non-conducting state. Also, as the exciter output decreases, the voltage stays negative for longer periods of time.

It will be apparent the free wheeling rectifier 26 may be disconnected from any one of the phases. During the starting period, rectifier 26 carries the positive half cycle of induced field current and the average current from rectifier 26 will be about 0.45 times the R.M.S. induced field current. It is obvious that two small rectifiers 26 connected in series may be used in the circuit for carrying the current, instead of one rectifier of larger current capacity but of the same voltage rating. With this arrangement, the induced field current will be divided between three similar parallel paths consisting of the pair of rectifiers 18 and 20 respectively connected to each of the three phases. The rectifiers also could be connected in parallel. A reverse polarity rectifier may be mounted on the same heat sink with rectifiers 20 and this would help to balance the controlled rectifier weight on the fan.

Figure 2:
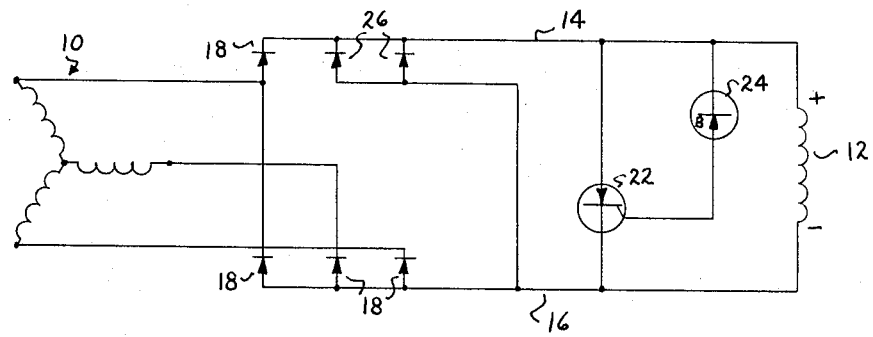
FIGURE 2 is a modification similar to FIGURE 1 except a pair of rectifiers is used for assuring conversion of the controlled rectifier to a non-conducting state.

Still another arrangement consists of that illustrated in FIGURE 2. The circuit shown is the same except that two rectifiers 26 are disconnected from the bridge and used as free wheeling rectifiers. The benefit obtained is that the circuit then is capable of approximately doubling the current capacity during the starting period. However, the exciter capacity is reduced since only one positive diode is available for the output current of the exciter. The field current is carried part of the time by the disconnected free wheeling rectifiers so that the exciter capacity is still adequate for the motor application where no overload capacity is required as in the case with generators.

FIGURE 3 illustrates a circuit providing half wave rectification of the exciter voltage. As shown, rectifiers 18 are connected to two phases of the exciter winding 10 while the third rectifier 26 is connected in parallel with the synchronous machine field winding 12. The controlled rectifier 22 and zener diode 24 are connected in the circuit and perform the same function as that described in connection with FIGURE 1.

When the synchronous machine armature winding is energized, either for motor or generator operation, induced voltages are generated in the field 12 and when these reach a magnitude sufficient to cause the zener diode 24 to conduct, the output from this diode provides current to the gate of controlled rectifier 22 and converts it to a conducting state. When the field winding lower terminal is positive, the rectifier 26 carries the field winding current, and when the upper terminal becomes positive during the next half cycle, the controlled rectifier shorts the field winding 12 and thereby carries the current in the circuit. As in FIGURE 1, when the induced voltage of the field winding 12 is less than the zener diode voltage 24, the controlled rectifier could be kept in a conducting state by the exciter output current, but since the rectifiers 18 are connected in the circuit in the manner shown, the voltage applied to the field winding 12 is permitted to go to zero once per cycle, and then this occurs, the controlled rectifier 22 is converted to a non-conducting state, thereby permitting the full application of the excitation power from the exciter to be applied to the field winding 12. If for any reason the induced voltage exceeds the exciter output voltage and is of a magnitude sufficient to cause the zener diode 24 to conduct, it again will repeat the above described process of turning on the controlled rectifier 22 for shorting the field winding.

Figure 3A:
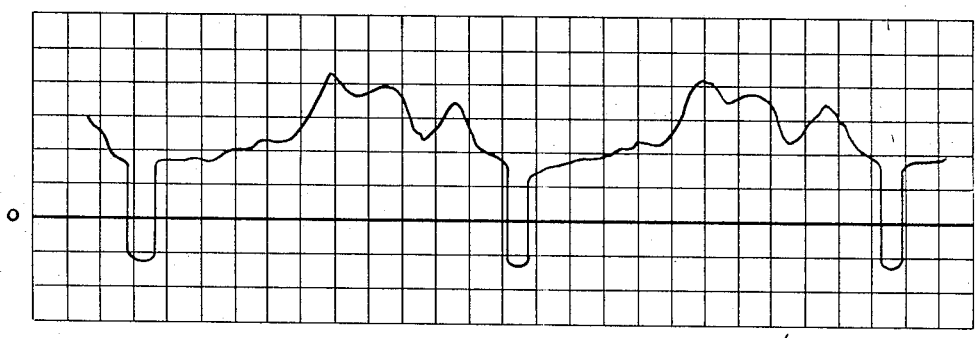
FIGURE 3A illustrates curves applicable to the circuit of FIGURE 3.

To illustrate operation of the circuit, oscillograms were taken of the voltage when a motor was pulled into synchronism on reluctance torque and with a rectifier substituted for the controlled rectifier 22 shorting the output of the exciter. As illustrated in FIGURE 3A, the curves show that the voltage across rectifier 26 reverses by about 0.7 volt for 0.4 millisecond every cycle. Because the voltage becomes negative for this time period, the time involved is more than adequate to assure converting the controlled rectifier to a non-conducting state when the current through the controlled rectifier is negative.

Although a controlled rectifier 22 is under the control of a zener diode 24, it will be understood the zener diode may be omitted and a single controlled rectifier be used for shorting the machine field winding. When the diode is omitted, a controlled rectifier may be used of the type that can be safely converted to the conducting state when the field voltage exceeds the forward breakover voltage for which the rectifier is designed. If the controlled rectifier is equipped with a gate terminal, the latter may be left open. In this case, the controlled rectifier controls shorting of the machine field winding 12. When the induced voltage reaches the breakover voltage for which the controlled rectifier is designed, it becomes conductive and permits the flow of current from the field winding therethrough in the conducting direction for one-half of a cycle, while the field winding is shorted for the other half cycle through the rectifiers. When the current through the controlled rectifier decreases to zero, it will then be converted to a non-conducting state and excitation power will then be supplied to the field winding.

In lieu of using a controlled rectifier, other voltage sensing devices with switching type characteristics may be used in place of the controlled rectifier. These include for example, commercially available three, four, or five layer semiconductor devices which can effectively supplant the controlled rectifier in the circuit. It will be noted the circuit disclosed herein is particularly well suited to accepting a single voltage sensing device. At present however, cost considerations and better control of the switching voltage favor the use of a zener diode in the circuit.

As a modification, the free wheeling rectifier 26 of FIGURES 1 and 2 may be omitted from the circuit and the remaining rectifiers then are used for supplying power to the circuit. With a circuit of this design, the remaining rectifiers will provide unidirectional power to the field winding but the total capability of the rectifiers is not as great as when the free wheeling rectifier also is used. The operation of the circuit and the voltage wave forms will remain essentially unchanged. The free wheeling function then will be performed by the rectifiers 18 and the two rectifiers 20 shown on the left side of FIGURE 1. During starting, the postive induced field current capacity will be greater since it is carried by two sets of rectifiers 18 and 20 instead of the single rectifiers 26.

The free wheeling rectifier 26 also may be omitted from the half wave rectifier of FIGURE 3 but the exciter voltage and current capacity would be reduced and the starting performance would not be as great.

This improved circuit arrangement not only provides improved performance from the standpoint of reliability but the costs for the circuit performance are reduced substantially since the controlled rectifier and the zener diode are chosen to have the same rating and characteristics as the pair of each of these two components used in the circuit of my prior patent. As indicated in the previous portion of the specification, the circuit is applicable to both motors and generators.

Although the invention has been described in relation to a brushless synchronous machine, it will be apparent the teachings are applicable equally to those arrangements wherein the exciter constitutes a separate machine not physically associated with the synchronous motor or generator.

Also, it is obvious a separate alternating current power source, as distinct from an exciter, may be used in supplying excitation power to the field winding 12. In one case, the power source may take the form of the synchronous motor or generator itself which feeds current back through a regulator to the rectifiers 18 and 20, which, in turn, supplies the excitation voltage to the field winding 12.

Figure 4:
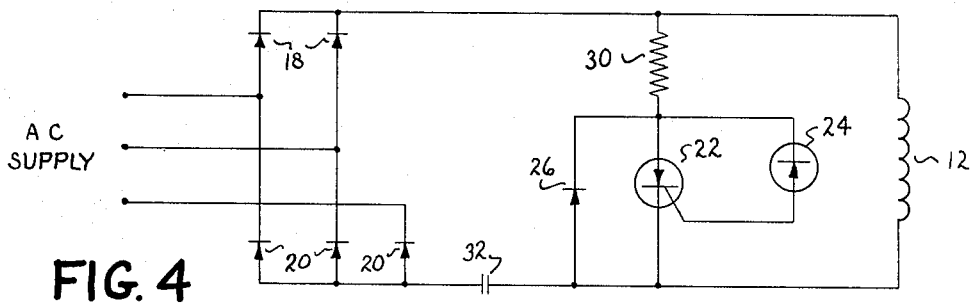

As illustrated in FIGURE 4, the alternating current power source may be the same as that serving other industrial equipment. In the modification shown, the rectifiers 18 and 20 supply unidirectional voltage to the field winding 12 as before.

The circuit includes a voltage sensing device with switching type characteristics, such as the controlled rectifier 22 under the control of a zener diode 24. In the event the A.C. source is of low impedance, a resistor 30 is connected in series with the rectifier 26 and the controlled rectifier 22 to limit the current flow in the circuit. An advantage gained from using the resistor in the circuit in this way is that it serves to increase the starting torque when the circuit is used for motor operation.

In operation, the machine, such as a synchronous motor, having the field winding 12, is accelerated by induction motor action to synchronous speed. During the starting period, when the induced voltages reach a magnitude sufficient to convert the controlled rectifier to a conducting state, the controlled rectifier shorts the field winding 12 during one-half of the induced voltage cycle while the free wheeling rectifier 26 conducts when the voltage reverses in the other half of the cycle. When the synchoronous speed is reached, the switch 32 is closed, thus permitting the A.C. power source to supply the excitation power through rectifiers 18 and 20 to the field winding 12.

As indicated in the discussion of the modification to FIGURE 1, a five layer diode for example, having characteristics such that it conducts in both directions after the switching voltage is exceeded, may be substituted for the controlled rectifier and zener diode combination.

In view of the above, it will be apparent that many modifications and variations are possible in light of the above teachings. It therefore is to be understood that within the scope of the appended claims the invention may be practiced other than as specifically described.

What I claim as new and desire to secure by Letters Patent of the United States is:

1. A synchronous machine and polyphase exciter combination wherein the exciter supplies excitation power to the machine field winding,
   rectifiers connected between all but one of the exciter output winding terminals and a terminal for the machine field winding for supplying excitation power thereto,
   means connecting the other terminal of the field winding to the neutral point in the exciter output winding,
   a silicon controlled rectifier connected across the machine field winding terminals in a direction to carry negative induced field current,
   a control device connected between the gate of said controlled rectifier and the field winding and being responsive to voltages induced in said field winding to convert the controlled rectifier to a conducting state when said voltages reach a predetermined maximum.

2. The combination according to claim 1 wherein an additional rectifier is connected across the field winding and in a direction to carry positive induced field current.

3. An excitation system for the field winding of a synchronous electric machine, said system comprising:
   (a) an exciter having a polyphase armature winding;
   (b) a protective circuit connected in parallel circuit relationship with said field winding for limiting the magnitude of induced field voltage during asyncronous operation, said protective circuit comprising means for establishing a shunt path for negative induced field current in response to induced negative field voltage above a predetermined magnitude, said means being characterized by recovery from a conductive to a nonconductive state only when the current therethrough is essentialy interrupted; and,
   (c) an unbalanced rectifier bridge connected to said armature winding and to said field winding supplying unidirectional power to said field winding that is interrupted once each cycle, whereby said means is enabled to switch to a nonconductive state once each cycle even in the absence of positive induced field current.

4. The system of claim 3 wherein said unbalanced rectifier bridge comprises a five-arm bridge adapted to supply unidirectional power for approximately five-sixths of each cycle of exciter output voltage.

5. The system of claim 4 wherein said means for establishing a shunt path comprises a silicon-controlled rectifier.

6. The system of claim 5 including a free wheeling diode shunting said field winding for conducting positive induced field current.

7. A synchronous machine and polyphase exciter combination wherein the exciter supplies excitation power to the machine field winding, rectifiers connected from all but one of the exciter output winding terminals to a terminal of the machine field winding for supplying unidirectional excitation power thereto, means connecting the other terminal of the field winding to the neutral point in the exciter output winding, and a protective circuit connected in parallel circuit relationship with said field winding for limiting the magnitude of induced field voltage during asynchronous operation, said protective circuit comprising at least one voltage sensitive triggerable semiconductive device connected directly across said field winding and responsive to negative induced field voltage above a predetermined magnitude to establish a shunt path for negative induced field current, said device being characterized by recovery from a conductive to a nonconductive state only when the current therethrough is essentially interrupted.

References Cited by the Examiner

UNITED STATES PATENTS

| | | | |
|---|---|---|---|
| 2,116,378 | 5/1938 | Bany | 318—174 |
| 3,009,091 | 11/1961 | Hallidy | 322—28 |
| 3,098,959 | 7/1963 | Rosenberry | 318—181 |
| 3,100,279 | 8/1963 | Rohner | 318—167 |
| 3,137,811 | 6/1964 | Kirk | 322—28 X |
| 3,151,288 | 9/1964 | Avizenis | 322—28 |
| 3,217,229 | 11/1965 | Ballard | 322—25 X |

ORIS L. RADER, *Primary Examiner.*

G. FRIEDBERG, *Assistant Examiner.*